March 8, 1966  H. L. BJELLAND ET AL  3,238,841
OPTICAL DISPLAY APPARATUS

Filed May 8, 1963  5 Sheets-Sheet 1

Inventors.
Harley L. Bjelland
David A. Grafton
Stephen M. F. Mak

By: *Louis A. Kline*
*John J. Matlago*
*Dominick Nardelli*

Their Attorneys.

Inventors.
Harley L. Bjelland
David A. Grafton
Stephen M. F. Mak

By: *Louis A. Kline*
*John J. Maclago*
*Dominick Nardelli*
Their Attorneys.

March 8, 1966    H. L. BJELLAND ET AL    3,238,841
OPTICAL DISPLAY APPARATUS

Filed May 8, 1963    5 Sheets-Sheet 3

Inventors,
Harley L. Bjelland
David A. Grafton
Stephen M. F. Mak

By: *Louis A. Kline*
*John J. Matlago*
*Dominick Nardelli*
Their Attorneys.

3,238,841
OPTICAL DISPLAY APPARATUS
Harley L. Bjelland, Palo Verdes Estates, David A. Grafton, Santa Monica, and Stephen M. F. Mak, Los Angeles, Calif., assignors to The National Cash Register Company, Dayton, Ohio, a corporation of Maryland
Filed May 8, 1963, Ser. No. 278,922
10 Claims. (Cl. 88—24)

The invention relates, generally, to optical data or information display apparatus and, more particularly, to apparatus for displaying time varying information on a background or reference of fixed information.

In a copending application of Carl O. Carlson et al., Serial No. 78,389, which was filed December 27, 1960, and assigned to a common assignee, now Patent No. 3,134,297, there is disclosed a display system wherein the visibility or the persistency (time of presence) of pertinent portions of a displayed image may be controllably varied. Generally, this result is accomplished by projecting fixed information along an axis to form an optical image thereof on a first image plane in which resides a metachromatic (hereinafter called photochromic) film. The photochromic film is normally in a clear transmissive state but is characterized by a point-to-point variation in the light transmissivity thereof in response to auxiliary radiation in the form of ultraviolet light. The information introduced in the photochromic film, by the auxiliary radiation, represents the additional time varying information to be included in the image to be displayed in a second image plane or viewing screen. In the preferred embodiment, this time varying information represents the course of a moving object which is apparent on the viewing screen in the form of an image of a moving trace or trail superimposed over the image of fixed information in the form of a map, for example. It is thus noted that the photochromic film serves as an object plane upon which varying information is continually superimposed over the projected image of the fixed information, and from which the display image is instantaneously achieved by the second projection means of the system.

Although the display system, as taught in the above mentioned Carlson et al. application, represents an improvement over previous less versatile type display systems, there are still problems associated with such a system that limit the usefulness of its operation. Thus, the Carlson et al. application teaches that a plurality of "off-axis" auxiliary light beams including rays in the ultraviolet band of the electromagnetic spectrum, may be employed to simultaneously write traces of moving objects on the photochromic film. Each of the "off-axis" writing beams directs a focused spot of ultraviolet energy onto the photochromic film to effectively write thereon a persistent opaque trace that is then readily projected onto the viewing screen so as to be superimposed over the image of the fixed information. Although the use of an "off-axis" writing beam has many advantages it also presents problems. For example, it is highly desirable when operating display equipment to at times not provide an opaque trace of an object or vehicle being tracked, but to merely indicate on a display screen, the instant position of an object being tracked, i.e., to track without leaving any history. Furthermore, it is highly desirable at certain times to selectively provide a brightly illuminated visible light spot on the viewing screen to enhance the leading end of a particular trace being formed. This not only serves as a means for obtaining the attention of an observer but it also helps to focus the observer's attention on selected ones of the currently forming traces, and is especially useful if the viewing screen is large, or filled with the history of a plurality of previously written traces. However, when an "off-axis" visible light beam is used to form a non-writing beam, i.e., a beam which is void of light in the ultraviolet band, the non-writing beam merely passes through the photochromic film in the direction of the "off-axis." Thus, since the non-persistent spot impinging on the photochromic film does not render the film opaque, the spot is not projected along with the image of the background information by the second projection means of the system, and hence the spot is not rendered visible on the viewing screen.

Therefore, one of the objects of the present invention is to provide a novel arrangement for redirecting and controlling an "off-axis" auxiliary optical beam of visible light such that a non-writing light spot can be selectively projected alone or in conjunction with a trace being formed by a coexisting writing light spot, onto a viewing screen.

Another problem associated with displays employing photochromic film is that the persistency of the trace written on the photochromic film is a function of the length of time the material in the path of the trace is exposed to the beam of ultraviolet light. Traces with uniform persistency are desired, that is, traces which have their leading-ends continually forming and their trailing-ends gradually fading out. A preferred form of a moving trace, therefore, is one that is evidenced by a gradual fading away from its leading-end toward its trailing-end. Thus, when employing such a system, if an "off-axis" beam of ultraviolet light is continually focused on the photochromic film, and if a vehicle being tracked by the "off-axis" arm varies in speed during tracking, the traces of the slower movements of the vehicle inherently have a longer persistency than the traces of the faster movements of the vehicle. This is undesirable since the trace formed is not uniform and the tail of the trace may not be the portion of the trace to first gradually fade away, as is desired. Moreover, fi the display indicates traces of two vehicles moving at different speed, the slower forming trace inherently has a longer persistency than the faster forming trace, because the writing time for the slower forming trace is inherently longer than the writing time for the faster forming trace. From the above it should be clear that it is highly desirable to control the manner in which a beam is employed to write a trace on a photochromic film in order to obtain a uniformly persistent moving trace which best indicates the history of the object being tracked.

Accordingly, another object of this invention is to provide a controlled intermittent writing beam arrangement which forms a uniformly persistent moving trace on the screen irrespective of the changes in speed of the vehicle or vehicles being tracked.

Still another problem associated with displays of the type herein described is the need of providing a linear relationship between movement of the writing lens and the movement of the writing light beam as focused on the photochromic film, such that the trace properly indicates the course and relative movements of the object being tracked. Prior "off-axis" writing techniques indicate that when a writing lens is employed to focus a light spot from a fixed light source onto the film, the light spot is properly focused at only one point on the film. Movement of the writing lens, unless carefully controlled, causes the light spot to be defocused to an undesirable extent. Therefore, to maintain the focus of the spot, as required when writing a trace, the writing lens must be moved along a prescribed non-linear path relative to the plane of the film. Although this results in a properly focused track at all points on the screen it is accompanied by complications in mechanization due to non-linearity in the relationship between the writing lens movement and the movement of the writing light beam at the film. Not only is it difficult to mechanize the proper movements of the writing lens due to the fact that the writing lens and the focused writing beam are moving in different planes, but, furthermore, the servo system design may be complicated by the necessity to provide corrections for these deviations.

Thus, another object of the present invention is to provide a novel, simplified, movable optical arrangement for obtaining a simple, linear relationship between the movement of the writing lens and the movement of the writing beam as focused on the film while still maintaining a focused spot at all points on the screen.

In general, the display apparatus of the present invention provides a light source that produces composite light rays including visible light and ultraviolet light, and provides optical means for collecting the light rays from the light source for producing a primary projection beam and a plurality of auxiliary beams. The auxiliary beams are disposed in optical paths surrounding the optical path of the primary beam. The primary beam is devoid of ultraviolet light and focuses an image of background information on a first image plane in which resides a photochromic film and a light directing means. The optical means for each of the auxiliary beams provides for selectively focusing on the first image plane a moving light spot corresponding to the trace of an object being tracked. In order to maintain the moving light spot in focus, the light rays in the auxiliary beam are collimated and a movable writing lens collects the collimated light rays to focus the light spot as it moves over the first image plane. The movement of the writing lens is confined to a plane parallel to the first image plane so that a linear relationship is obtained between the movement of the writing lens and the movement of the light spot over the film residing in the image plane. The light rays in the auxiliary beam may be selectively controlled to provide either visible light alone, or a composite of visible light and ultraviolet light. The ultraviolet light in the composite light spot forms an opaque spot on the normally clear and transmissive photochromic film, which opaque spot has a persistency depending on the time required for it to decay back to a clear state. The visible light in the composite light spot, being a non-writing light, does not affect the photochromic film. The light directing means is provided to redirect the visible light spot such that the image of the background information together with the superimposed non-persistent spot and persistent spot (corresponding to the trace of the object being tracked) can be projected upon a viewing screen. Uniform persistency of each opaque spot on the photochromic film is ensured by repeatedly moving the writing lens in steps and exposing the photochromic film to the ultraviolet light in the composite light spot for a fixed interval of time after each step. During the interval between exposure to the ultraviolet light only the visible light forms the light spot impinging upon the image plane.

Other objects, advantages and features of the present invention will become apparent from consideration of the following description when taken in conjunction with the appended claims and the drawings wherein:

The present invention, like the invention disclosed in the above mentioned application, includes the utilization of a metachromic or photochromic material which is disposed in a light beam at the image plane formed by a suitable optical system. Information is introduced into the optical system in the form of an optical pattern of both primary radiation (which may be of light in any given waveband but preferably not in the blue-ultraviolet spectrum) and auxiliary radiation (which includes ultraviolet light). The primary radiation pattern normally represents fixed or semi-fixed information of an object means, such as a background map, grid and/or cursor, and the time varying auxiliary radiation, represents variable information, inasmuch as it causes the photochromic film to become temporarily opaque to thereby form a "trace" having a gradually disappearing tail. Therefore, the photochromic material transmits a portion of the primary radiation pattern in the form of an altered optical pattern to a projection lens system for display. Thus, by suitably varying the path of the auxiliary radiation projected onto the plane of the photochromic material, desired traces of moving objects may be readily shown on the screen. These photochromic materials, having the properties just described, are materials whose radiation transmission characteristics are controllably variable in response to variations of applied energy such as heat and light. Such photochromic materials include, for example, elementary and complex spiropyrans and derivatives thereof. Specific examples of exemplary classes of such photochromic materials are given in the above mentioned Carlson et al. application.

Figure 1:
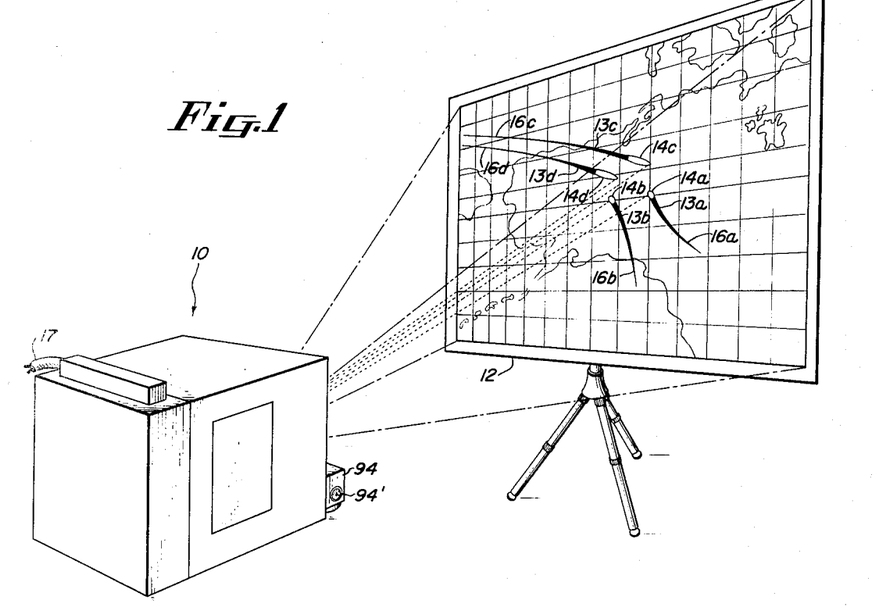
FIG. 1 is a perspective view of the overall display system showing the display apparatus projecting an image of background information and superimposed traces on a viewing screen.

Referring to the drawings, and in particular to FIG. 1, a display system is shown wherein an improved display apparatus 10 is used to project an image on a viewing screen 12. The image on the viewing screen 12 includes a reference background of fixed or semi-fixed information, for example, a map overlaid with a uniform grid network. The image on the screen 12 also includes four traces, 13a, 13b, 13c and 13d, that are continually being formed or written on the map. Each trace such as trace 13a has a uniformly disappearing tapered tail 16a and a bright illuminated white spot 14a disposed at its lead end, i.e., at the head of the trace. Two of the traces 13a and 13b are shown with round white spots 14a and 14b, respectively, while the other two traces 13c and 13d are shown with elongated white spots 14c and 14d, respectively. White spots of various shapes can be used to distinguish between the various objects that are being tracked on the viewing screen. For example, the round white spots 14a and 14b may indicate the present location of two relatively slowly moving objects being tracked, and the elongated white spots 14c and 14d may indicate the present location of two faster moving objects being tracked. The display system shows the relative present position of the white spots 14a, 14b, 14c and 14d, and writes the traces 13a, 13b, 13c and 13d on the map projected on screen 12 (in a manner to be hereinafter described) from suitable electrical signals fed to the system by way of a cable 17. These signals are obtained, for example, from a radar tracking network (not shown). The traces 13a, 13b, 13c and 13d indicate the path of the objects that are being tracked and have lengths, as viewed on the screen, that are directly related to the relative speed of the object being tracked.

Figure 2:
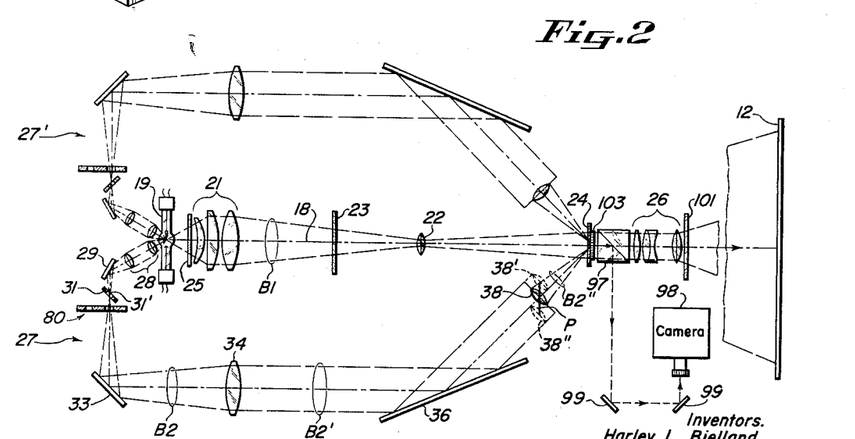
FIG. 2 is a schematic diagram of the optical system of the display apparatus.

In order to produce the image as shown in FIG. 1 and, in particular, to produce traces having the characteristics mentioned above, the detailed description of the display apparatus 10 will now be given. Referring to FIG. 2, wherein a schematic representation of the optical system of the display apparatus 10 is shown, the image on the screen 12 of FIG. 1 is formed by a primary light beam that is represented by a bundle of rays B1 directed along a primary axis 18. A lamp (which supplies the light rays for the primary beam B1) is, for example, a mercury vapor lamp that produces light rays both in the visible and ultraviolet portion of the spectrum. An ultraviolet absorbing filter 25 is disposed near lamp 19 within the beam B1 to absorb the ultraviolet light. A primary condensing lens system 21 collects the visible light passing through the filter 25 to form the primary beam B1, and focuses the light at a plane in which is disposed a relay lens 22.

An object means 23 is inserted within the primary beam B1, between the condensing lens system 21 and relay lens 22. The object means 23 contains the fixed information or the map shown in the image on the screen 12 (FIG. 1), and is positioned in relation to the relay lens 22 so that an image of the object means 23 is formed in a first image plane. The photochromic material in the form of a thin photochromic film 24 is placed at this first image plane. Adjacent the photochromic film 24 is a light directing means 103, whose function will be described hereinafter. The image formed at the plane of the photochromic film 24 is reprojected by a projection lens system 26 to form the image of the viewing screen 12. A suitable beam splitter 97 is positioned on axis 18 near the film 24 to reflect a portion of the light in the beam B1 to mirrors 99 and, in turn, to a camera 98 so that a permanent record can be made of the display on the viewing screen 12. Also, inserted within the primary beam B1 is a neutral density filter 101 which is used to control the brightness of the image on the viewing screen 12.

In order to vary, with respect to time, the information represented by the image projected onto the viewing screen 12 (i.e., to provide traces of moving objects on the screen) one or more auxiliary light beams are provided. A seprate auxiliary beam is used to write each of the traces. Two folded optical paths 27 and 27' for forming two of the auxiliary beams are shown schematically in FIG. 2. The two auxiliary beams thus provided are similar to each other and, therefore, only one of the optical paths, path 27, will now be described.

The optical path 27 for forming one of the auxiliary beams B2 includes an auxiliary condensing lens system 28 mounted near the lamp 19, as shown. The light rays from the lamp 19 are collected by the auxiliary condensing lens system 28 and are reflected by a first folding mirror 29 towards an apertured plate 31, that is disposed in the focal plane formed by lens system 28. The light rays from the lamp 19 are focused at the plate 31. Aperture plate 31 having an aperture 31' (more clearly shown in FIG. 6) is disposed at an angle of, for example, 45° with respect to the optical path of the light rays for reasons that will be explained hereinafter.

The diverging light rays from the aperture 31' next pass through a light shuttter assembly 80 (whose function will also be explained hereinafter) and the optical path is folded a second time, by a second folding mirror 33, so that the path 27 is now disposed substantially parallel to axis 18. A collimating lens 34, being disposed in optical path 27, causes the diverging bundle of rays B2 from aperture 31' in aperture plate 31 to become collimated and to form a collimated beam B2' having a relatively large cross-sectional area with a substantially uniform light intensity throughout to simulate a light source which is effectively at infinite distance, as far as a writing lens 38 is concerned. This result is best obtained by placing the aperture 31' in plate 31 at the back focal point of the collimating lens 34. The collimated beam B2' is folded by a third folding mirror 36 so as to be directed towards the photochromic film 24 to form an angle of, for example, 45° with the axis 18. The cross-sectional area of the collimated beam B2' is such that the entire plane surface of photochromic film 24 as well as the areal surface surrounding the film 24 is illuminated by the collimated beam B2'. The intensity of the ultraviolet light in the collimated beam B2' is too low to make the photochromic film 24 opaque. Thus, in order to write on the film the light rays in this auxiliary beam B2', including the ultraviolet light, are focused and concentrated onto a small spot so that the intensity of the ultraviolet light is relatively large. In the embodiment of the display apparatus 10 being described, the converging or writing lens 38 focuses a light spot on the photochromic film 24, as writing lens 38 is suitably mounted and disposed to move within the bounds of the cross-sectional area of the collimated beam B2', as indicated by the alternate positions 38' and 38'' of the writing lens 38 shown by dotted lines. The writing lens 38 has a lens opening much smaller than the cross-sectional area of the collimated beam B2'. Therefore, only the portion of the collimated beam B2' that passes into the writing lens 38 forms the converging beam indicated by the converging bundle of light rays B2''. Since the converging light rays B2'' are directed at the film 24 at an angle of approximately 45 degrees, which is the same angle that aperture plate 31 makes with the optical path 27, a focused, reduced image that is a reproduction of the aperture 31' is produced on the film 24 by the converging light rays B2''. This reduced image is referred to herein as the light spot.

Figure 3:
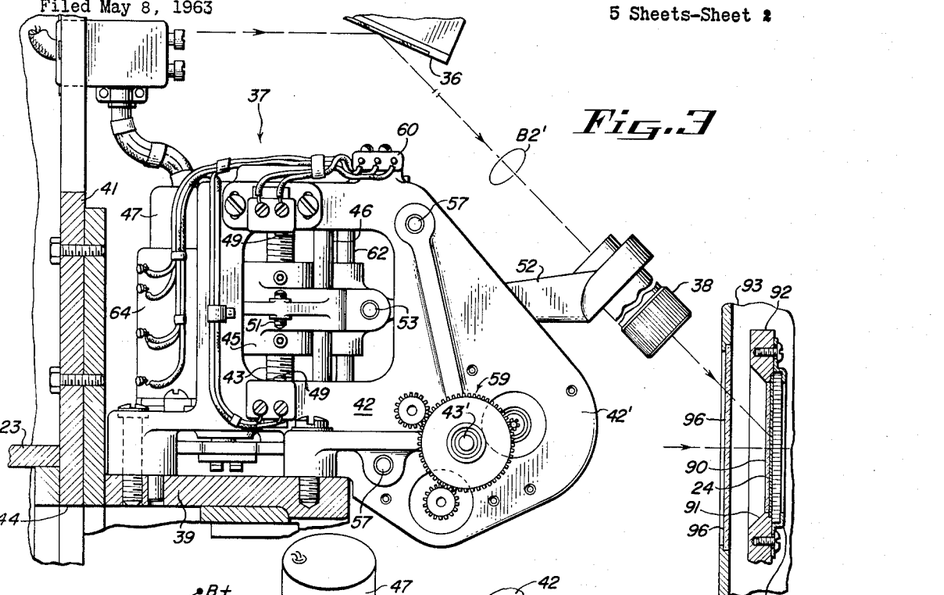
FIG. 3 is an enlarged orthographic elevation of one of the X-Y translation means for supporting and moving one of the writing lenses in the display apparatus.

Referring to FIG. 3, the writing lens 38 is shown supported by an X–Y translation means 37 which moves the lens 38 in two orthogonal directions in a plane parallel to the plane of photochromic film 24. The plane in which lens 38 is confined to move is indicated by a heavy line P (FIG. 2). Because the lens 38 moves only in a plane parallel to the plane of film 24 and because the cross-sectional area of the collimated beam B2' is greater than the lens opening of writing lens 38, the light spot is always in focus on the film and the amount of light per unit time, received by the writing lens 38, is always uniform even though the light spot is focused near the edge of the photochromic film 24. Thus, a focused light spot of uniform intensity is produced irrespective of the position of the spot on the photochromic film 24. One advantage of this arrangement is that the apparatus and servo means for producing one-to-one linear movement relationship between the motion of lens 38 and the light spot which forms the trace is simplified as will be seen hereinafter. Another advantage is that a uniform appearing trace can be formed on film 24 by the display apparatus 10 as long as the velocity of the object being tracked is uniform. However, if the velocity of the object being tracked is not uniform and unless other features are provided in the system, a uniform appearing trace would not be formed, as the photochromic film 24 becomes overexposed when the tracked object slows down and becomes underexposed when the tracked object speeds up. The features that produce a uniform appearing trace 13, even though the velocity of the tracked object is not uniform, will be described hereinafter.

Figure 4:
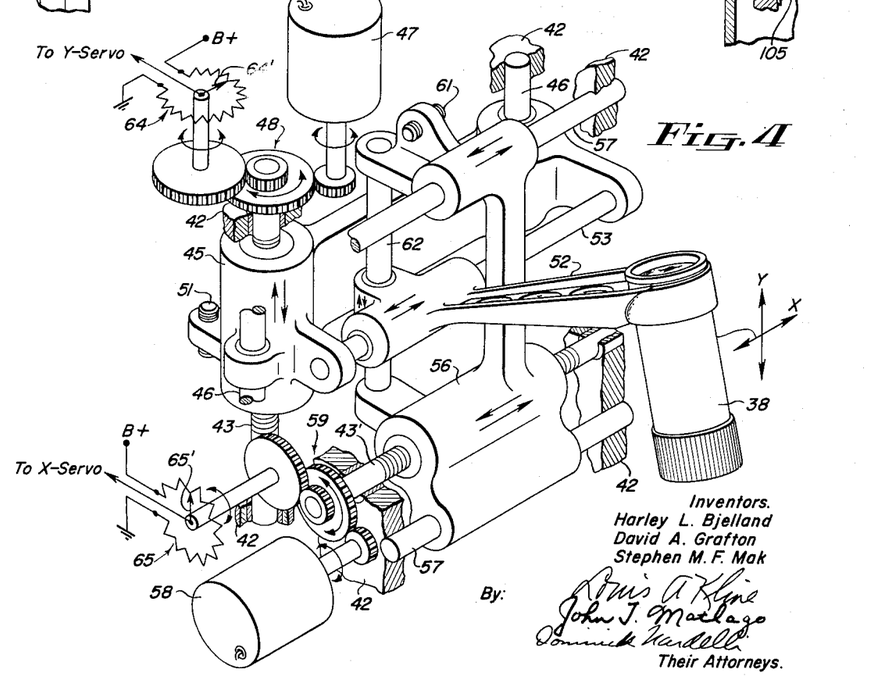
FIG. 4 is a pictorial schematic view of the X-Y translation means.

To form the four traces 13a, 13b, 13c and 13d shown on screen 12, four auxiliary beams are required and each writing lens 38 moves independently of every other writing lens. Therefore, an X–Y translation means is provided in the system to move each of the writing lenses. One of these X–Y translation means 37 is shown in FIG. 3. The details of the X–Y translation means 37 that cause the writing lens 38 to move only within the plane defined by line P (FIG. 2) and parallel to the photochromic film so that the focused light spot is always produced will now be described. FIG. 3 is an elevation of one of the X–Y translation means as mounted within display apparatus 10, and FIG. 4 is a pictorial view of the same. The X–Y translation means 37 comprises a stationary frame 42 that is mounted suitably within the display apparatus 10. Referring primarily to FIG. 4, within the frame 42 are mounted two rotating lead-screws, a Y lead-screw 43 and an X lead-screw 43'. Suitable bearing supports are provided at each end of and between the lead-screws 43 and 43' and the frame 42. (Only fragmentary broken portions of the frame 42 are shown in FIG. 4 in order to show where the elements are mounted thereto.) The Y lead-screw 43 is aligned to rotate about an axis parallel to the Y ordinate (Y arrow) and the X lead-screw 43' is aligned to rotate about an axis parallel to the X abscissa (X arrow). Threaded to the Y lead-screw 43 is a Y yoke 45 that is translatable in the Y direction when the Y lead-screw 43 is rotated. In order to accurately guide the Y yoke 45 to move in a straight line, two spaced Y guide-rods 46 are provided to slidably engage suitable bushings disposed in lugs formed on the Y yoke 45. The Y guide-rods 46 are fixed at their ends to the frame 42, and the movement of the Y yoke 45 on Y lead-screw 43 is limited within the walls forming frame 42. A Y electric-motor 47, preferably a stepping-motor, causes the Y lead-screw 43 to rotate through suitable gearing means 48. To limit the movement of the Y yoke 45 within the frame 42, upper and lower Y microswitches 49 (FIG. 3) are suitably mounted on frame 42 so as to engage a pin 51 that is fixed to and moves with Y yoke 45. When either one of the Y microswitches 49 is contacted by the end of pin 51, the circuit shown in FIG. 5a is prevented (in a suitable manner not shown) from energizing the motor 47, thus stopping the motor 47 from moving the Y yoke into the frame 42.

Motion in the Y direction is translated from the Y yoke 45 to the writing lens 38 via a rod 53, secured to move with the Y yoke 45. On rod 53 is mounted the support-end of a writing arm 52. The writing lens 38 is supported at the end of the writing arm 52 opposite the support-end so that the principal axis of the writing lens is parallel to the collimated beam B2' after it is reflected by the third folding mirror 36. As shown in FIG. 4, at the support-end of the writing arm 52, two bores are formed, perpendicular to each other. One of the bores in the support arm 52 slidably engages the rod 53 through a suitable bushing. The rod 53 is disposed parallel to the X abscissa and is fixed at its ends to the Y yoke 45. When Y yoke 45 moves vertically, the writing lens 38 likewise moves in the Y direction.

Motion in the X direction is translated to the writing arm 52 and writing lens 38 by an X yoke 56, threaded to be moved by the rotation of the X lead-screw 43'. Like Y yoke 45, X yoke 56 slidably engages two X guide-rods 57. The guide-rods 57 are also fixed at their ends to frame 42, and the X movement of the X yoke 56 on X lead-screw 43' is limited within the frame 42. An X electric-motor 58, preferably a stepping-motor, causes the X lead-screw 43' to rotate through suitable gearing means 59. To limit the movement of the X yoke 56 within the frame 42, two X microswitches are suitably mounted and spaced on frame 42 (a housing 60 for one of the X microswitches is shown in FIG. 3). The X microswitches are very similar in detail and function to Y microswitches 49. A pin 61 on the X yoke 56 makes contact with either X microswitch 60, when X yoke 56 is near the end of its travel, and the X yoke is stopped from moving in that direction. The other bore in the support-end of the arm 52 slidably engages a rod 62, that is disposed parallel to the Y direction, and fixed at its ends across the X yoke 56. When the X yoke 56 moves, the writing lens 38 moves in the X direction.

The X–Y translation means operates as follows: if Y stepping-motor 47 is rotating and X stepping-motor 58 is stopped, only the Y lead-screw 43 rotates and causes the Y yoke 45 to move in the Y direction. The Y guide-rods 46 prevent the Y yoke from rotating with the Y lead-screw 43. Thus, the rod 53, being fixed to the Y yoke, also moves in the Y direction and is always oriented parallel to the X abscissa. As the rods 53 move in the Y direction, the arm 52 and writing lens 38 also move in the Y direction causing the arm 52 to slide along the rod 62. On the other hand, if Y stepping-motor 47 is stopped and X stepping-motor 58 is rotating, only the X lead-screw 43' rotates and causes the X yoke 56 to move in the X direction. The X guide-rods 57 prevent the X yoke 56 from rotating with the X lead-screw. In turn, the rod 62, which is always oriented parallel to the Y ordinate, moves laterally in the X direction. As the rod 62 moves in the X direction, the arm 52 and writing lens 38 also move in the X direction causing the arm 52 to slide along Y bar 53. If both stepping-motors 47 and 58 are simultaneously rotating, both the horizontal and vertical movement operations are performed simultaneously in the X–Y translation means 37.

In order to automate the X–Y translation means 37 with the before mentioned signals from the radar tracking network, the relative location of the light spot formed by the writing lens, with respect to the fixed information, should be known. A Y potentiometer 64, that engages Y gearing means 48, is used to indicate the position of the writing lens 38 in the Y direction relative to a fixed reference. An X potentiometer 65, that engages X gearing means 59, is likewise used to indicate the position of the writing lens 38 in the X direction relative to a fixed reference. The X gearing means 59 and the Y gearing means 48 are so designed to cause the voltage pickoffs 65' and 64' of X potentiometer 65 and Y potentiometer 64, respectively, to make no more than one revolution as the writing lens 38 moves from limit to limit in the X direction and in the Y direction, respectively. The lead from each voltage pickoff 64' and 65' is coupled to a servo means (FIG. 5a), to be more fully explained below.

Since FIG. 4 is a schematic representation of the X–Y translation means 37, the scale of the components therein has been distorted, and the elements such as the Y stepping-motor 47, the Y potentiometer 64, the X stepping-motor 58, and the X potentiometer 65 are arranged differently than as shown in FIG. 3, in order to show the principle of operation. The Y stepping-motor 47 and the Y potentiometer 64 are visible in FIG. 3, but the X stepping-motor 58 and the X potentiometer 65, being mounted behind flange 42' of the frame 42, are not shown. However, the X gearing means 59 is visible in FIG. 3. Both motors 47 and 58 are mounted directly to the frame 42. The parts comprising the X–Y translation means are precision made so that the play and backlash is eliminated.

Since the writing lens 38 is moved by small incremental steps in either the X direction or Y direction by the X stepping-motor or the Y stepping-motor, respectively, the display apparatus 10 has an added feature that controls the writing time for each opaque spot that is used in forming one of the traces on the photochromic film. The light spot that writes the opaque spot on the film 24 is formed by the writing lens 38 which collects a portion of the light rays in collimated beam B2' (FIG. 2) and focuses a reduced image of the aperture 31' in aperture plate 31 onto the photochromic film 24. Each step through which the X–Y translation means 37 moves the writing lens 38, is of such a size as to cause the newly written opaque spot to overlap the previously formed opaque spot. Since the opaque spots are overlapping and each opaque spot has equal persistency, a uniform appearing trace 13 is produced in the image projection on the screen 12. A uniform appearing trace is defined herein to be a trace that has a smooth appearance, wherein each small segment of the trace fades in direct relation to the length of time since it was written.

Figure 5A:
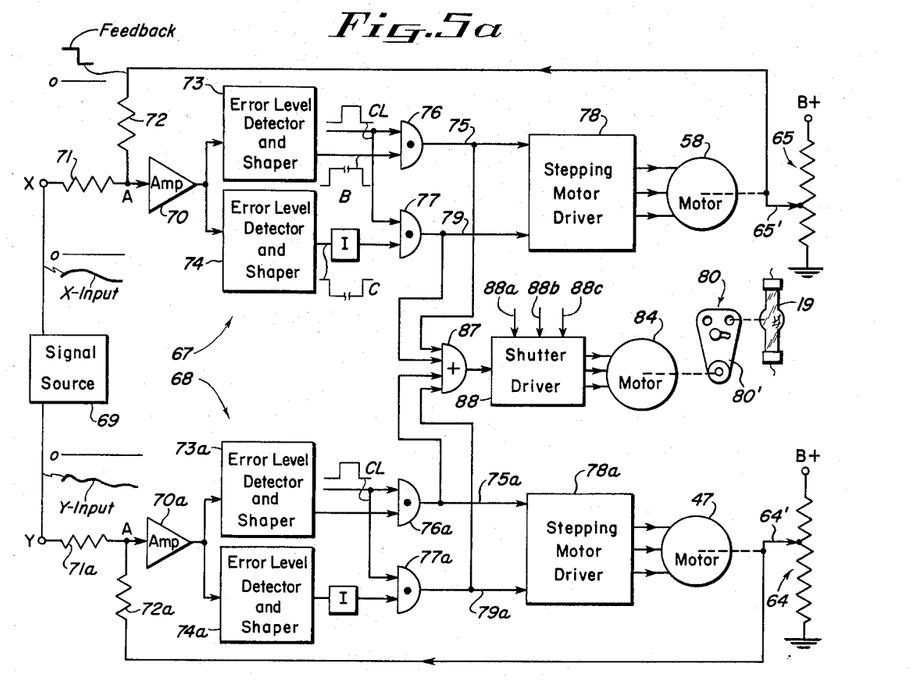
FIG. 5a is a block diagram of the servo means for controlling the X-Y translation means and the shutter means.
Figure 5B:
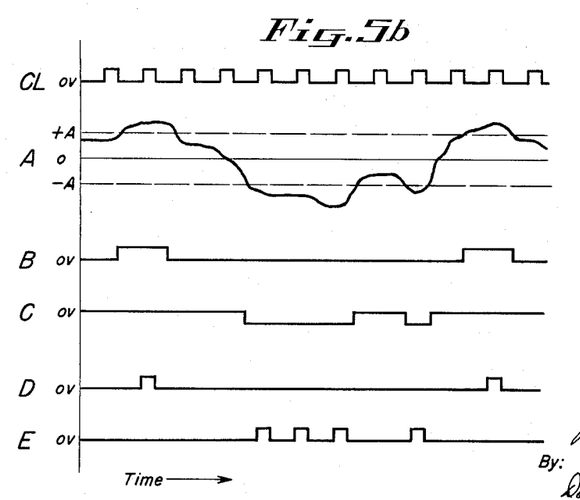
FIG. 5b is a graph of various signal waveforms as produced in one of the servo-systems of the servo means.

The means that enables the display apparatus 10 to write a trace formed by a series of opaque spots of equal persistency on the photochromic film 24, will now be explained. Referring to FIG. 5a, a block circuit diagram is shown of the servo means for controlling one of the X–Y translation means 37 and one of the light shutter assemblies 80 (shown enlarged in FIG. 6). The embodiment of the servo means shown in FIG. 5a operates on a direct current (D.C.) power supply and comprises two identical servo-systems, an X servo-system 67 and a Y servo-system 68, that actuate the X stepping-motor 58 and the Y stepping-motor 47, respectively. The before mentioned tracking radar represented by a signal source 69 produces separate X input signals and Y input signals in the form of analog voltages for the X position and for the Y position of the object being tracked. The X input signals and the Y input signals are coupled to terminals X and Y, respectively. Since the servo-systems 67 and 68 are identical, only the X servo-system 67 will be described and, unless otherwise noted, elements in the Y servo-system 68, which elements are like the elements in X servo-system 67, will be designated by the letter "a" after the reference numeral. The electrical X input signals, which are variable and preferably below ground potential are coupled to an input of an amplifier 70 through a summing resistor 71. The D.C. power supply is coupled to X potentiometer 65 to provide the feedback voltage which is preferably above ground and which is determined by the relative position of pickoff 65' on X potentiometer 65. (Since the pickoff 65' is moved by steps, the feedback voltage will be stepped, as shown.) The feedback voltage is also coupled to the input of the amplifier 70 through another summing resistor 72. Resistors 71 and 72 comprise one embodiment of a summing network and are connected to a common terminal A which is, in turn, connected to the amplifier 70. The currents in both resistors 71 and 72 are added at the terminal A to form waveform A as shown in FIG. 5b. This waveform is fed to the amplifier 70. If the potential difference between the pickoff 65' and ground is greater than the potential difference between terminal X and ground, a positive error current is produced at terminal A, and if the potential difference between the pickoff 65' and ground is less than the potential difference between terminal X and ground, a negative error current is produced at terminal A. The error current is amplified by amplifier 70 and coupled simultaneously to a positive error level detector and shaper circuit 73 and to negative error level detector and shaper circuit 74.

The positive error level detector and shaper circuit 73 may be any standard circuit that produces a positive square signal when the error current coupled thereto is above a given positive threshold current. The negative error level detector and shaper circuit 74 may be any standard circuit that produces a negative square signal when the error current coupled thereto is lower than a given negative threshold current. For example, referring to FIG. 5b, waveform A represents a typical composite analog error current signal at terminal A (FIG 5a) with respect to time. An amplified version of the waveform A is coupled to both positive and negative error level detector and shaper circuits 73 and 74. The dashed lines across the graph represent the positive and the negative threshold currents +A and −A, respectively. Waveform B represents the shape of the signal produced by the positive error detector and shaper circuit 73 in response to the positive portion of waveform A, while waveform C represents the shape of the signal produced by the negative error detector and shaper circuit 74 in response to the negative portion of waveform A. Both waveforms B and C are at zero potential during the time the error current represented by waveform A is between the values of +A and −A. When waveform A rises in value above +A, circuit 73 produces a sharp rise in waveform B. When waveform A falls in value below +A, circuit 73 sharply drops waveform B to zero potential. Conversely, when waveform A falls in value below −A, circuit 74 produces a sharp drop in waveform C, and when waveform A rises in value above −A, waveform C returns to 0 volts. Waveform B is coupled to AND gate 76 and waveform C is coupled to a suitable inverter I to be changed to a positive signal that is coupled to AND gate 77. Also coupled respectively to AND gates 76 and 77, are clock signals represented by waveform CL. Then, depending upon which one of the AND gates 76 and 77 is opened by waveform B and the inverse of waveform C, appropriate clock signals pass therethrough. Waveform D represents the signal as produced on output lead 75 by AND gate 76. Waveform E represents the signal as produced on output lead 79 by AND gate 77.

Then, whenever AND gate 76 passes a clock signal, as when the feedback voltage is too high, the gated clock signal is coupled to a stepping-motor driver circuit 78 to drive the X stepping-motor 58 in a direction to move pickoff 65' closer to ground potential. For this condition, the feedback voltage drops as shown at the left of FIG. 5a. However, if AND gate 77 passes a clock signal, as when the feedback voltage is too low, the gated clock signal is coupled to the stepping-motor driver circuit 78 to drive the X stepping-motor 58 in a direction to move pickoff 65' to a higher level above ground potential. Of course, if neither AND gate 76 nor 77 passes a clock signal because the error current is below threshold value, the X stepping-motor 58 is not actuated. The Y servo-system 68 operators in the same manner as the X servo-system 67 and independently thereof, except that pickoff 64' on potentiometer 64 is actuated.

An alternate embodiment of the servo means just described would be to use an alternating current (A.C.) power supply instead of the D.C. power supply. This embodiment is not shown but, briefly, comprises an A.C. power supply coupled to potentiometer 65, instead of a D.C. power supply. The X input signal, which is also A.C. (the same frequency as the A.C. supplied to the X potentiometer 65) is coupled to the X input terminal. Whenever the amplitude of the input signal is greater than the feedback signal, a summing network is used to produce an error signal that is in phase with the reference signal. Conversely, when the amplitude of the input signal is smaller than the feedback signal, the summing network produces an error signal that is 180° out-of-phase with the reference signal. The A.C. error signals are amplified, for example, in an amplifier 70 and are coupled to only one of the error level detectors and shaper circuit, for example, circuit 73. Then whenever the amplitudes of the A.C. signals coupled to the circuit 73 are above the given threshold, positive square signals are produced by the circuit 73 for each positive portion of the cycle. These positive square signals are coupled, for example, to both AND gates 76 and 77 from circuit 73. However, the clock signals, fed to the AND gate 76, are 180° out-of-phase to the clock signals applied to AND gate 77 (which is equivalent to feeding alternate clock signals CL to each AND gate). Then, when the error is in-phase, AND gate 76 passes a signal to rotate the stepping-motor 58 to cause the feedback signal to increase; and when the error is out-of-phase AND gate 77 passes a signal to rotate the stepping-motor 58 in the counter direction to cause the feedback signal to decrease. Again, as in the embodiment using D.C., clock signals are not gated to the stepping-motor driver circuit 78 when the error between the reference signal and the feedback signal is at a value below the threshold value. To avoid error, the clock signals are derived from the same A.C. supply applied to the potentiometer.

If the input signals applied to either input terminal X or Y are changing at a rapid rate, either stepping-motor 47 or 58 is being stepped at a rapid rate by the servo means. Therefore, the focused light spot would be stationary at any given area for a relatively short time. However, if both voltages are changing at a slower rate, both stepping-motors 47 and 58 are being stepped at a slower rate by the servo means. Therefore, in the absence of any control of the exposure time of the writing light spot, the focused light spot would be stationary at any given area for a relatively longer time than when either input voltage is changing rapidly. This would present problems inasmuch as the trace formed would not be uniform. For example, if the clock signals CL have a frequency of 25 cycles per second and if the conditions were such that the focused light spot formed by the writing lens 38 were to move every time a clock signal appears, the writing time for each opaque spot would be approximately 40 milliseconds (minus the short time interval that the light spot takes to move positions). However, if the conditions were to change such that every other clock signal CL were stopped from passing the AND gates 76 and 77, 76a and 77a, the writing time for each opaque spot on the film 24 would then be twice as long (80 milliseconds). With this mode of operation some of the opaque spots in the same trace would have greater persistency than others, and a uniform appearing trace would not be formed. Therefore, in order to overcome the problem of non-uniformity in persistency caused by this mode of operation, the shutter assembly 80 is inserted within each of the optical paths as previously described in connection with FIG. 2. The function of the shutter is to make each opaque spot on the film 24 have the same persistency.

Figures 6, 7, 8:
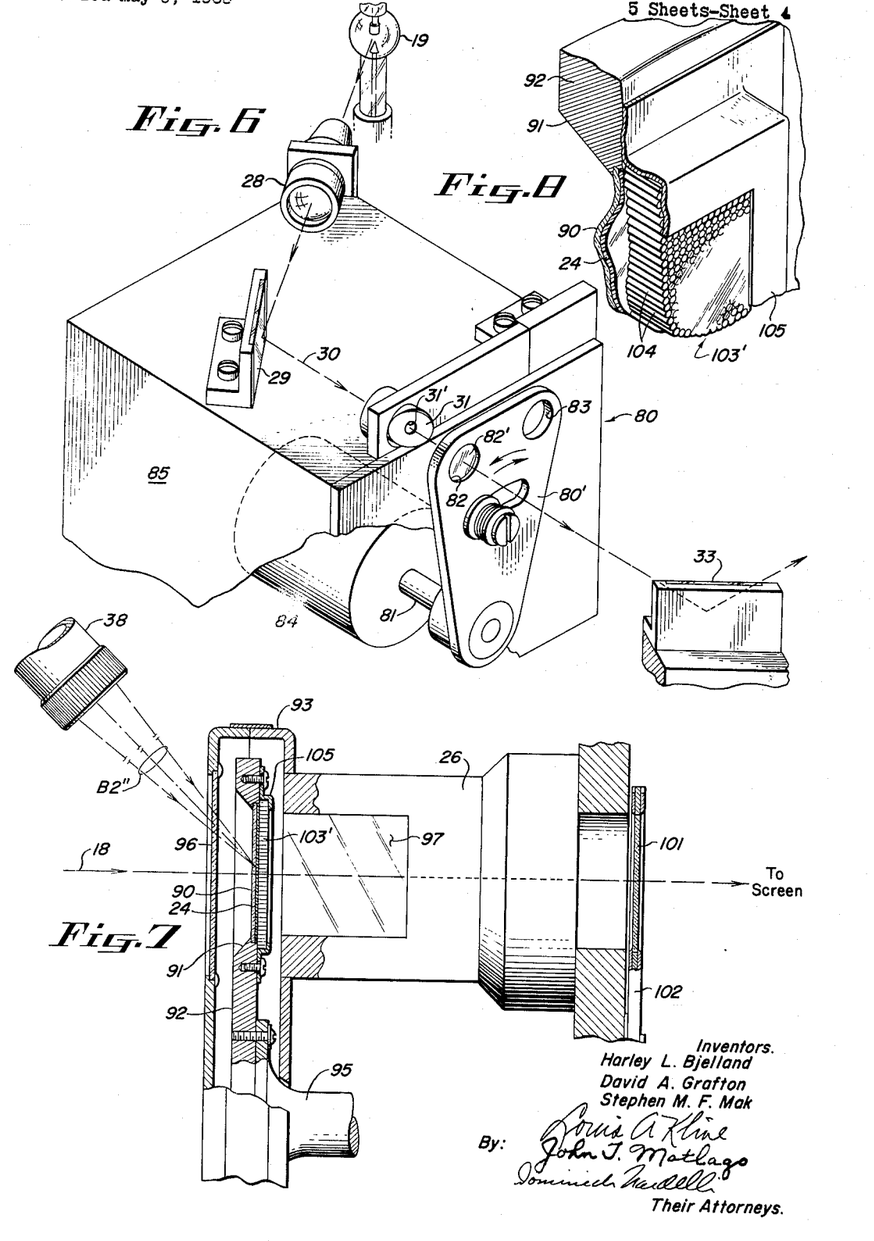
FIG. 6 is an enlarged pictorial view of the shutter means for one of the auxiliary beams used to write a trace and as enclosed by circle 6—6 of FIG. 9.
FIG. 7 is an enlarged view of the portion of the display apparatus including, primarily, the photochromic film and the fiber optic plate and as enclosed by circle 7—7 in FIG. 9.
FIG. 8 is an enlarged, partial pictorial view of a corner portion of the photochromic film and fiber optic plate assembly.

Referring to FIG. 6, the shutter assembly 80, which is an example of each of the four shutter assemblies in display apparatus 10, is shown. The shutter assembly has a triangular shutter plate 80' that is rotatable into three positions by a shaft 81. Two apertures 82 and 83 are formed in the shutter plate 80', each spaced at an equal distance from the axis of shaft 81. The shaft 81 is disposed to be rotated to three separate angular positions by a shutter electric motor 84, preferably a stepping-motor, suitably mounted in an enclosure 85. The first of the three positions of the shutter plate 80' is as shown in FIG. 6 wherein aperature 82 is aligned with the aperture 31' in the optical path 27. Aperture 82 supports an ultraviolet absorbing filter 82' and, therefore, when aperture 82 is aligned with the optical path 27, light rays in beam B2' that are void of the ultraviolet light are focused by the writing lens 38 onto the photochromic film 24 to form the non-writing or the non-persistent light spot. The second position of shutter plate 80' is when aperture 83 is aligned with the optical path 27. Aperture 83 is shown void of any filters. Therefore, when aperture 83 is aligned with the optical path 27, a composite spot of light including the ultraviolet light and the white light as found in the light beam B2', is focused by the writing lens 38 onto the photochromic film 24. The third position of the shutter plate 80' is when neither aperature 82 or 83 is aligned with the optical path 27 and the apertures 82 and 83 are disposed on each side of the optical path 27. The shutter 80 is primarily in this third position whenever the particular auxiliary beam B2 is not needed for the display. As shown in FIG. 6, the auxiliary condensing lens system 28, the first folding mirror 29 and the aperture plate 31 are all suitably mounted to the enclosure 85. The aperture plate 31 is disposed at an angle to the axis of the portion of auxiliary beam B2 represented by dashed line 30. As shown, aperture 31' is circular in shape but it may be in the form of an ellipse or even a pointed star. Since the plate 31 is angularly disposed, an exact reproduction of the aperture 31', whatever its shape, is reproduced by the focused light spot on the photochromic film 24 and projected on the viewing screen 12.

Referring again to FIG. 5a, the operation of the shutter assembly 80 will now be explained. Whenever a clock signal is gated by any of the AND gates 76, 77, 76a and 77a a signal is gated by an OR gate 87 to a shutter driver circuit 88. Then, depending upon which lead 88a, 88b, or 88c, a signal is received from a manual control panel (not shown) with shutter driver circuit 88 commands the shutter motor 84 to do one of three operations. For example, a signal is applied to lead 88a so that the trace 13a can be written on the photochromic film 24. At the command of the signal in lead 88a, the shutter driver circuit 88 initially actuates the shutter motor 84 to align aperture 82 (containing the ultraviolet absorbing filter 82') with the optical path 27. Then, when OR gate 87 feeds a signal to the shutter driver circuit 88, shutter motor 84 is, in turn, actuated by the shutter driver circuit 88 to align apertaure 83 with the optical path for a short, fixed interval (for example, 30 milliseconds) which is sufficient time to write an opaque spot on the photochromic film 24 with the ultraviolet light. It should be noted that a visible spot is also focused at the same point on the film, at this time. After the short interval has elapsed, the aperture 82 is realigned with the optical path 27 by the circuit 88. It should be noted at this time that the ultraviolet light has been cut off but the visible light spot is still focused on the film. Thus, the writing time of each opaque spot is uniform and both the visible light spot and the trace being formed by the ultraviolet light spot are projected on the screen. If a signal is applied to lead 88b, only a moving visible light spot, i.e., a non-persistent spot is displayed on the viewing screen 12 as the shutter driver circuit 88 commands the shutter motor 84 to leave aperture 82 aligned with the optical path 27. Therefore, only the visible light spot is moved across the photochromic film 24 at the command of the X–Y translation means 37. Since the visible light is directed from an "off-axis" position, it is directed so as to be made visible on the viewing screen 12 by means 103. If a signal is applied to lead 88c, the shutter driver circuit 88 commands the shutter motor 84 to hold the shutter plate 80' in its third position whereby all the light rays in the auxiliary beam B2 to the photochromic film 24 are cut off.

Since visible light that contains light from the non-writing band of the spectrum is also focused to form a light spot on the photochromic film 24, the means 103 (mentioned above) that enables the visible light spot to be properly displayed on the screen 12, will now be described. Referring to FIGS. 7 and 8, an enlarged cross-sectional view and an enlarged partial pictorial view of the photochromic film 24 are shown, respectively. Since the photochromic film 24 has a plastic base, it is preferably applied as a thin coating on the surface of a glass plate 90, the the glass plate 90 is suitably mounted in an aperture 91 of a rotatable disc 92. As described in the above mentioned Carlson et al. application, there are a plurality of glass plates coated with photochromic films mounted on disc 92, but only one glass plate 90 coated with photochromic film 24 is aligned at a time with the primary axis 18. The disc 92 can be suitably rotated by a means applied to a shaft 95, so that the other glass plates coated with photochromic film can be rotated to be aligned, in turn, with axis 18, as required. Since the persistency of the photochromic film is controllable by heat, to increase the overall persistency of the traces, the disc 92 is enclosed in a refrigerated chamber 93. The temperature of the refrigerated chamber 93 is suitably controlled by a small refrigeration unit 94 (FIG. 1), for example, a compact thermoelectric refrigeration unit having a temperature control knob 94'. The refrigeration unit 94 is suitably mounted on the display apparatus 10.

As shown in FIG. 7, the converging beam B2", as produced by writing lens 38, passes through a glass plate 96 forming part of the envelope of the refrigeration chamber 93. Also, the primary projection beam B1 that is along axis 18 passes through the glass plate 96 to the photochromic film 24. The projection lens system 26 projects the optical image of the map and traces formed at the photochromic film onto the viewing screen 12. The beam splitter 97 is placed on the axis 18 to reflect a portion of the primary projection beam B1 at 90° to the axis 18 (out of the drawing as viewed in FIG. 7) so that the camera 98 (shown schematically in FIG. 2) can take a picture of the information being displayed.

Also disposed on axis 18 is the neutral density filter 101 suitably mounted on a rotatable disc 102. A plurality of neutral density filters of varying density are also mounted on disc 102 in order that the brightness of the image on the screen 12 is controllable by simply placing a different filter in way of the beam B1.

As mentioned above, the projection lens system 26, besides projecting the visible light in beam B1 towards the viewing screen 12, also projects the visible light in the converging beam B2″ towards the viewing screen 12. To accomplish this the resulting visible light in beam B2″ which is directed toward the film at an angle is bent by the light directing means 103, so as to be redirected along the primary axis 18. In this embodiment, the light directing means 103 of FIG. 2 is shown as a fiber optic plate 103′ in FIG. 7. The fiber optic plate 103′ is made of a multitude of very small diameter (about .001 inch) transparent fibers 104 laid parallel to each other (more clearly shown in FIG. 8). The fiber optic plate 103′ is disposed parallel to the photochromic film 24 with the ends of the fibers 104 lying next to the photochromic film 24. A suitable clamp 105 holds the fiber optic plate 103′ and the glass plate 90 with the photochromic film 24 in the aperture 91 of disc 92.

The visible light in the primary projection beam B1 is not appreciably affected by the fiber optic plate 103′, and the opaque traces on the photochromic film 24 superimposed over the image of object means 23 is readily reprojected on the viewing screen 12. However, the fiber optic plate 103′ has the property of collecting light rays, especially visible light, having a relatively large angle of incidence with the surface thereof and redirecting them so that the visible light is also projected on the viewing screen 12. Other light control mediums, for example, a frosted screen, may be used instead of the fiber optic plate 103′ but the resulting image on the viewing screen 12, especially with the non-persistent, visible light spot, would not be as good as when the fiber optic plate 103′ is used.

Figure 9:
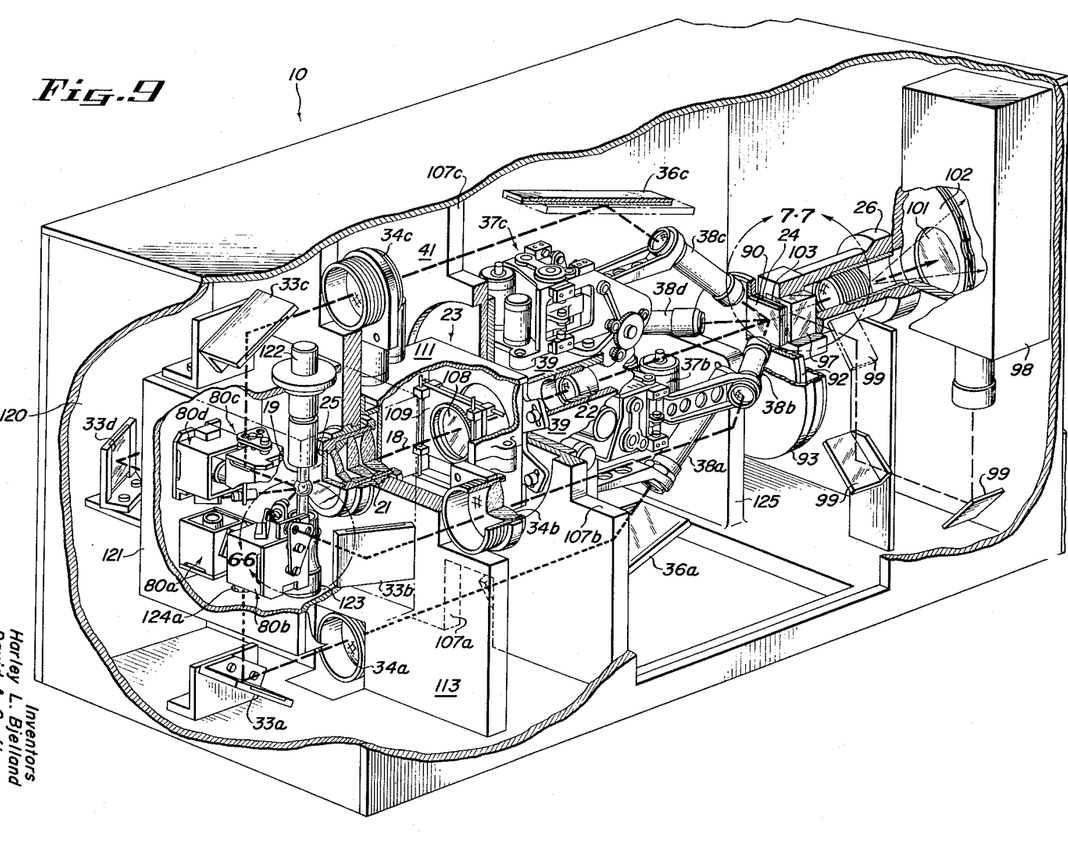
FIG. 9 is a broken away, enlarged, perspective assembly view of the display apparatus.

Having described the primary features of the display apparatus 10, a typical embodiment of the display apparatus 10 showing how these features are incorporated into a compact unit, will now be described. Referring to FIG. 9, an enlarged pictorial view of the display apparatus 10 is shown with sections broken away in order to show the internal arrangement of the elements. Since the apparatus 10 is symmetrical about the axis 18 the structure of the sections removed is similar to the structure shown. The display apparatus 10 has an elongated enclosure 120 with a substantially square cross-section, the enclosure 120 being divided primarily into three compartments by transverse walls 41 and 113. The axis 18 is centrally located with respect to the enclosure 120 and the optical paths for forming the four auxiliary light beams are disposed symmetrically about the axis 18. A box 121 is fixed to the wall 113, and the lamp 19 is disposed therein. Two suitable lamp sockets 122 and 123 mounted to opposite upper and lower walls of box 121 support the lamp 19. Four shutter assemblies 80a, 80b, 80c and 80d, that are similar to the shutter assembly 80 shown in FIG. 6, are suitably mounted to the interior walls of the box 121. The four optical paths are spaced around the axis 18 at 90° intervals. Elements shown in FIG. 9 that form each auxiliary optical path, have the same reference numeral as similar elements shown in FIG. 2, however, each reference numeral is followed by a letter of the alphabet. Elements that form the same auxiliary optical path have the same letter following their reference numerals. The walls of box 121 have four suitable openings, for example an opening 124a, to allow the light rays forming one of the auxiliary beams to pass through.

The transverse wall 113 also supports the primary condensing lens system 21, the filter 25, and four collimating lenses 34a to 34d (lens 34d is hidden from view). Four second folding mirrors 33a to 33d are suitably mounted, as shown, to reflect the light rays of each auxiliary optical path into its respective collimating lens 34a to 34d. This arrangement provides for the light rays from the lamp 19 to be directed towards the transverse wall 41 and onto the front of the display apparatus 10.

On the rear side of the transverse wall 41 is mounted the object means 23 and on the front side surrounding the axis 18 are mounted the four X–Y translation means 37a to 37d (only portions are visible). The wall 41 has an opening 44 concentric with axis 18 (which is more clearly shown in FIG. 3) in which the object means 23 is mounted. The object means 23 includes an image plate 108 containing a picture of the map. A carriage plate 109, mounted within a frame 117 and movable in the X and Y directions, supports the image plate 108. The image plate 108 is mounted so that it is rotatable with respect to the carriage plate 109. Thus, the image of the map projected on the screen may be rotated and moved in both the X and Y directions.

The four X–Y translation means are each mounted on a flange 39 and the four flanges protrude from the wall 41 and enclose the opening 44. The relay lens 22 is conveniently mounted within the four flanges 39 on the axis 18. The transverse wall 41 has four suitable openings 107a to 107d (opening 107d is hidden from view). Each collimated beam B2′ passes through one of the respective openings to the folding mirrors 36a to 36d (only mirrors 36a and 36c are shown) and into a respective writing lens 38a to 38d.

The temperature control chamber 93 with the photochromic film is supported by a partition 125. The projection lens system 26 and the beam splitter 97 are supported by the front wall 126 of the enclosure 120. Also, the neutral density filter 101 and disc 102 are supported on the front wall 126, opposite the side of that on which the projection lens system 26 is supported. The camera 98 is mounted, as shown, within the enclosure 120 and on one side of axis 18. The required optical distance required to produce a focused image in the film plane of the camera 98, is obtained by using three such mirrors 99, as shown.

With the present disclosure in view, modification of the invention will appear to those skilled in the art. Accordingly, the invention is not to be limited to the exact details of the illustrated preferred embodiment but includes all such modifications and variations coming within the scope of the invention as defined in the appended claims.

What is claimed is:

1. Optical information display apparatus comprising: first means for producing a primary light beam of a main optical path along an axis; second means disposed within said main optical path for supplying primary information to said primary light beam and for producing in a first image plane an optical image representative of said primary information; a normally transparent film disposed at said first image plane comprised of a material which is rendered opaque in response to light of a first wavelength band; third means for producing in an auxiliary optical path a substantially collimated light beam including light of said first wavelength band and directing said beam towards said first image plane at an angle to the axis of the main optical path; a writing lens for focusing at least a portion of the light in said collimated beam onto said first image plane; means for moving said writing lens in a plane disposed substantially parallel to said first image plane to produce at said first image plane a moving light spot of uniform area and intensity to enable the light of said first wavelength band to write a trace on said film; and a fourth means for projecting the information provided at said first image plane onto a second image plane.

2. Optical information display apparatus comprising:

first means for producing along an axis a primary light beam; second means disposed within said primary light beam for supplying primary information to said primary light beam and for producing in a first image plane an optical image representative of said primary information; third means for producing an auxiliary light beam containing auxiliary information which auxiliary light beam is directed towards said first image plane at an angle to the axis of said primary light beam; fourth means comprising a plurality of parallel disposed transparent fibers forming a fiber optic plate, one end of said fibers terminating substantially at said first image plane, for receiving said auxiliary light beam and causing it to be redirected along said axis; and fifth means for projecting in a second image plane a superimposed image including said primary information and said auxiliary information.

3. Optical information display apparatus comprising: first means for producing along an axis a primary light beam; second means disposed within said primary light beam for supplying primary information to said primary light beam and for producing in a first image plane an optical image representative of said primary information; third means for producing an auxiliary light beam; fourth means for collimating said auxiliary light beam and directing said auxiliary light beam towards said first image plane at an angle to the axis of said primary light beam; a writing lens for focusing a portion of the collimated light of said auxiliary beam on said first image plane; fifth means comprising a plurality of parallel disposed transparent fibers forming a fiber optic plate, one end of said fibers terminating substantially at said first image plane, for receiving said focused auxiliary light beam and causing it to be redirected along said axis; and sixth means for projecting in a second image plane a superimposed image including said primary information and said auxiliary information.

4. Optical information display apparatus comprising: first means for producing along an axis a primary light beam; second means disposed within said primary light beam for supplying primary information to said primary light beam and for producing in a first image plane an optical image representative of said primary information; a photochromic film disposed at said first image plane characterized by the formation therein of reversible opaque patterns in response to light of a first wavelength band; third means for producing along an auxiliary axis a substantially collimated light beam including auxiliary light of said first wavelength band; a writing lens for focusing a portion of the light comprising said collimated beam on said first image plane; a translation means for supporting said writing lens within said collimated light beam and for moving said writing lens within a plane disposed substantially parallel to said first image plane for writing a trace on said photochromic film; and a fourth means for projecting the information provided at said first image plane onto a second image plane.

5. Optical information display apparatus comprising: first means for producing along an axis a primary light beam; second means disposed within said primary light beam for supplying primary information to said primary light beam and for producing in a first image plane a first optical image representative of said primary information; a photochromic film disposed substantially at said first image plane, said film characterized by the formation therein of reversible opaque patterns in response to light rays of a first wavelength band and by the transmission without being affected thereby of light rays of a visible wavelength band; a fiber optic plate also disposed substantially at said first image plane for redirecting light rays of a visible wavelength received at said image plane from an off-axis position onto the axis of said primary light beam; third means for providing from an off-axis position a focused, moving, light spot on said photochromic film, said light spot including light rays of said first wavelength band and light rays of said visible wavelength band; said portion of moving light spot including light rays of said first waveband forming a reversible opaque trace on said film, and said portion of the moving light spot including light rays of a visible wavelength band being redirected by said fiber optic plate to simultaneously provide a bright visible spot at the leading end of the trace being formed; and a fourth means for projecting and forming in a second image plane an image of the superimposed information formed on said first image plane.

6. Optical information display apparatus comprising: first means for producing along an axis a primary light beam; second means disposed within said primary light beam for supplying primary information to said primary light beam and for producing in a first image plane an optical image representative of said primary information; third means including a normally transparent photochromic film disposed substantially at said first image plane, said photochromic film characterized by the formation therein of a reversible opaque spot in response to light rays of a first waveband and by the passing therethrough of light rays of a second waveband; a fiber optic plate disposed adjacent said photochromic film for collecting light rays of said second waveband directed thereto from an off-axis position and redirecting the light rays along the axis of the primary light beam; fourth means for producing a substantially collimated light beam including light rays of said first waveband and said second waveband which beam is directed toward said image plane at an angle to the axis of said primary light beam; a writing lens disposed to move within said collimated light beam in a plane substantially parallel to said first image plane for focusing the light rays comprising said collimated light beam to form a spot on said first image plane, said light rays of said first waveband forming a reversible opaque spot on said film, and said light rays of said second waveband being redirected by said fiber optic plate along said axis; and fifth means for projecting the superimposed image formed on said first image plane onto a second image plane, for viewing.

7. Optical information display apparatus comprising: first means for producing along an axis a primary light beam; second means disposed within said primary light beam for supplying primary information to said primary light beam and for producing in a first image plane an optical image representative of said primary information; a photochromic film disposed at said first image plane characterized by the formation therein of reversible opaque patterns in response to light of a first wavelength band; third means for producing along an auxiliary axis a substantially collimated light beam including light of said first wavelength band; a writing lens for focusing light of said collimated beam to provide a spot on said first image plane; a translation means for supporting said writing lens within said collimated light beam and for moving said writing lens within a plane disposed substantially parallel to said first image plane to simulate the movement of an object being tracked; shutter means positioned along said auxiliary axis for controlling the exposure time of the photochromic film to the spot formed by said first wavelength band of light in accordand with the advancement of said translation means to thereby form a series of equal persistent opaque spots representing the trace of the object being tracked on said photochromic film; and a fourth means for projecting the information provided at said first image plane onto a second image plane.

8. Optical information display apparatus comprising: first means for producing along an axis a primary light beam; second means disposed within said primary light beam for supplying primary information to said primary light beam and for producing in a first image plane an optical image representative of said primary information; a photochromic film disposed at said first image plane characterized by the formation therein of reversible opaque patterns in response to light of a first wavelength band; third means for producing a substantially collimated auxiliary light beam including light of said first wavelength band; a writing lens for focusing a portion of the light comprising said collimated beam to provide a spot on said first image plane; a translation means for supporting said writing lens within said collimated light beam and for confining the movement of said writing lens in two directions within a plane disposed substantially parallel to said first image plane; a servo means for actuating said translation means to move said writing lens by incremental steps in accordance with signals received from the object being tracked; shutter means disposed to control the light in said collimated light beam, said servo means being disposed to also actuate said shutter means to control the exposure time of said photochromic film to said light of a first wavelength band after each incremental step movement of said writing lens to thereby form a series of equal persistent opaque spots representing a trace of the object being tracked on said photochromic film; and a fourth means for projecting the information provided at said first image plane onto a second image plane.

9. Optical information display apparatus comprising: a light source for producing light rays including ultraviolet light and visible light; a first optical means including an ultraviolet absorbing filter for absorbing the ultraviolet light rays from said light source for producing along an axis a primary light beam; a second optical means disposed within said primary light beam for supplying primary information to said primary light beam and for producing in a first image plane an optical image representative of said primary information; a photochromic film disposed substantially at said first image plane and characterized by the formation therein of reversible opaque patterns in response to ultraviolet light; auxiliary optical means for collecting light rays from said light source and producing an auxiliary light beam; an aperture plate having an aperture disposed in said auxiliary light beam whereby a portion of the light rays in said auxiliary beam passes through said aperture; means including a collimating lens for collecting the light passing through said aperture and substantially collimating and directing the light rays in said auxiliary light beam towards said first image plane at an angle to the axis of said primary light beam; a writing lens disposed within said collimated beam to focus a light spot formed by said light rays on said first image plane; a translation means for supporting said writing lens within said collimated beam and for moving said writing lens in a plane substantially parallel to said first image plane for writing a reversible opaque trace on said photochromic film; and a projection lens for projecting on a second image plane the primary information in said primary light beam as modified by the trace on said photochromic film to form a second image at a second image plane.

10. Optical information display apparatus comprising: a light source for producing light rays including ultraviolet light and visible light; a first optical means including an ultraviolet absorbing filter for absorbing the ultraviolet light rays from said light source for producing along an axis a primary light beam; a second optical means disposed within said primary light beam and including an object means for supplying primary information to said primary light beam and for producing in a first image plane an optical image representative of said object means; a photochromic film disposed substantially at said first image plane and characterized by the formation therein of reversible opaque patterns in response to ultraviolet light; a fiber optic plate also disposed substantially at said first image plane adjacent said photochromic film for redirecting visible light rays received from an off-axis position onto the axis of the primary light beam; auxiliary optical means for collecting light rays from said light source and producing an auxiliary light beam; means including a collimating lens for substantially collimating the light rays in said auxiliary light beam; mirror means for reflecting said collimated auxiliary light beam to cause said beam to be directed towards said first image plane at an angle to the axis of said primary light beam; a writing lens disposed within said reflected collimated beam to focus a light spot formed by said light rays on said first image plane; a shutter means disposed in the path of said auxiliary light beam and selectively operable to either filter out the ultraviolet light from the beam and pass only the visible light or pass both the ultraviolet and the visible light; a translating means for supporting said writing lens within said collimated beam and for moving said writing lens in a plane substantially parallel to said first image plane for writing a reversible opaque trace on said photochromic film dependent upon whether said shutter means passes said ultraviolet light and for providing a non-writing light spot which is redirected along the axis by the fiber optic plate; and a projection lens for projecting the primary information in said primary light beam as modified by the trace on said photochromic film and the non-writing light spot to form a second image at a second image plane.

References Cited by the Examiner

UNITED STATES PATENTS

| 2,220,207 | 11/1940 | Busse | 88—24 |
| 2,825,260 | 3/1958 | O'Brien. | |
| 2,988,978 | 6/1961 | Craig. | |
| 3,086,113 | 4/1963 | McNaney. | |
| 3,134,297 | 5/1964 | Carlson et al. | 88—24 |
| 3,138,663 | 6/1964 | McNaney. | |
| 3,171,323 | 3/1965 | Schober et al. | 88—24 |

NORTON ANSHER, *Primary Examiner.*